United States Patent [19]
Henriott et al.

[11] Patent Number: 5,810,505
[45] Date of Patent: Sep. 22, 1998

[54] DOUBLE THREADED FASTENER SYSTEM

[75] Inventors: Jay M. Henriott, Jasper; Grover L. Miller, Chrisney, both of Ind.

[73] Assignee: Kimball International, Inc., Jasper, Ind.

[21] Appl. No.: 687,812

[22] Filed: Jul. 26, 1996

[51] Int. Cl.$^6$ ..................................................... F16D 1/00
[52] U.S. Cl. .................... 403/407.1; 403/405.1; 403/408.1; 312/111; 312/140; 312/265.5; 108/153; 108/180
[58] Field of Search ............................ 403/408.1, 407.1, 403/406.1, 405.1, 230; 312/111, 140, 265.5; 108/180, 153.1

[56] References Cited

U.S. PATENT DOCUMENTS

| | | |
|---|---|---|
| 1,194,792 | 8/1916 | Stewart . |
| 1,462,925 | 7/1923 | Wilburger . |
| 1,561,119 | 11/1925 | Smith . |
| 2,575,731 | 11/1951 | Santa . |
| 3,430,531 | 3/1969 | Bosse . |
| 3,962,843 | 6/1976 | King, Jr. .......................... 403/408.1 X |
| 4,097,061 | 6/1978 | Dietlein . |
| 4,496,261 | 1/1985 | Cohen et al. ..................... 403/408.1 X |
| 4,599,011 | 7/1986 | Tashiro et al. ........................ 403/407.1 |
| 4,728,215 | 3/1988 | Martincic et al. ............... 403/407.1 X |
| 4,869,564 | 9/1989 | Lechman ............................. 108/180 X |
| 4,886,326 | 12/1989 | Kuzyk ................................ 108/180 X |
| 5,103,741 | 4/1992 | Grund . |
| 5,403,109 | 4/1995 | Johnson et al. .................. 403/407.1 X |
| 5,536,078 | 7/1996 | Novikoff .......................... 403/407.1 X |
| 5,590,975 | 1/1997 | Horntvedt ............................ 403/407.1 |

*Primary Examiner*—Donald P. Walsh
*Assistant Examiner*—Emmanuel M. Marcelo
*Attorney, Agent, or Firm*—Baker & Daniels

[57] ABSTRACT

A fastener assembly adapted for use with furniture components. The fastener assembly includes a generally tubular insert having two ends and threads on both its exterior and interior surfaces. The exterior threads of the insert engage a body, such as a planar panel, through which the insert extends. The insert is installed in the body whereby the interior threads of the insert are accessible from both ends of the insert. Threaded fasteners may then be attached to both ends of the insert to thereby secure objects to the body in which the insert has been installed. The threaded fasteners which may be used with the inserts include common bolts as well as grooved dowels which are enageable with a camming device.

30 Claims, 5 Drawing Sheets

FIG_1

FIG_2

FIG_3

FIG_4

FIG_5

FIG_7

FIG_6

FIG_8

FIG_9

FIG_10

FIG_11

FIG_12

FIG_13

DOUBLE THREADED FASTENER SYSTEM

BACKGROUND OF THE INVENTION

1. Field of the Invention.

The present invention relates to fastener systems, and, more specifically, to a fastener system for use with modular panels in an office furniture system.

2. Description of the Related Art.

Modular furniture systems typically utilize a plurality of prefabricated modular panels to form, support and interconnect worksurfaces, shelves, overhead cabinets, other modular panels and a variety of other furniture components. The modular panels typically come in a variety of sizes, having widths which typically range from 6 to 60 inches, heights which typically range from 6 to 80 inches and panel thicknesses which typically range from 1 to 4 inches. The panels may be interconnected to form free standing wall units which serve as partitions and in turn support other office furnishings, such as shelves and worksurfaces, furniture components which are interconnected directly without the use of partitions or stand alone furniture units.

These modular panels and furniture components may be combined to create flexible office partition systems which are assembled in a variety of different configurations, with the configuration chosen depending upon the spacial constraints and functional requirements which must be addressed. Typically, the office system components are assembled into their final configuration on site. The spacial constraints and functional requirements can change over time, thereby requiring the disassembly and reconfiguration of the office system components.

To meet the need for a connection system which reliably, quickly and easily secures different furniture components and panels together, different fasteners have been employed. One type of fastening system utilizes a grooved dowel and a locking cam device which is well suited for securing components on site because of the minimal use of tools which is required. The grooved dowel is attached to a first panel or furniture component and extends from one side thereof, the extending portion of the dowel is then inserted into a bore in a second panel or furniture component and secured thereto by the action of the locking cam device.

If the grooved dowel is installed prior to shipment of the panel or furniture component, the dowel extends outward from the panel or component during shipment and the extending nature of the dowel increases the spacial requirements for shipping the components, can scratch or puncture other panels or components and is a potential safety hazard. If the dowel is not installed prior to shipment, the dowels must be installed on site in their correct location and orientation.

Alternatively, screws can be used to secure the panels and furniture components together on site. The screws may directly engage a panel or component with its threads or a nut and bolt assembly may be used to secure the various furniture components together.

Modular panels are often placed back-to-back in finished office systems where workstations or other furniture components are placed adjacent to one another. Such panels often have fasteners extending from one surface to support furniture components such as worksurfaces and overhead cabinets and an opposite planar surface which does not have any fasteners projecting therefrom. In order to efficiently use the available space, the uninterrupted planar surfaces of the modular panels are typically placed adjacent one another.

It is desired to provide an improved fastening system for modular furniture systems.

SUMMARY OF THE INVENTION

The present invention provides a double threaded fastener insert which provides an improved fastening system for modular furniture systems.

The invention comprises, in one form thereof, a generally tubular insert which has a threaded exterior and a threaded, hollow interior. The insert exterior threadingly engages a panel and is disposed in a manner which allows access to both of its opposing ends from opposite sides of the panel. Both ends of the insert provide access to a threaded interior space within the insert. The ends may be threadingly engaged by dowels having one threaded end, which engages the insert, and a second grooved end. The grooved ends of the dowels extend away from the opposite sides of the panel and are engaged by camming devices located in furniture components or panels which are thereby secured to the insert containing panel.

The invention comprises, in another form thereof, a similar generally tubular insert which has a threaded exterior and interior. The insert exterior threadingly engages a panel and is disposed in a manner which allows access to its opposing ends from opposite sides of the panel. Both ends of the insert may then be threadingly engaged by threaded fasteners such as bolts. The bolts may thereby secure furniture components or other items to opposing sides of the panel.

The invention comprises, in yet another form thereof, a generally tubular insert having a threaded interior and exterior which also has a slotted end. The slotted end is adapted to be engaged by a screwdriver or similar tool and thereby permits the double-threaded insert to be easily installed in a panel.

An advantage of the present invention is that a single insert can be used to provide two prethreaded holes for a furniture panel accessible from opposite sides of the panel. The use of such an insert simplifies the manufacture and assembly of an office furniture system by employing a single panel having fasteners projecting from opposite surfaces thereby replacing the use of two panels placed in a back-to-back arrangement and having fasteners projecting from only one surface.

Another advantage is that the use of a single insert simplifies the process of maintaining the proper alignment of the two threaded bore holes which are thereby located on opposite sides of the panel. This helps to assure the proper alignment of panels and furniture components in the assembled furniture system.

The use of prethreaded inserts also eases the installation of threaded dowels and bolts on-site. This is beneficial not only for the initial assembly of the office system, but for later changes in the configuration of the office system as well.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION

The embodiments disclosed below illustrate the present invention but are not intended to be exhaustive or limit the invention to the precise forms disclosed in the following detailed description.

Figure 1:
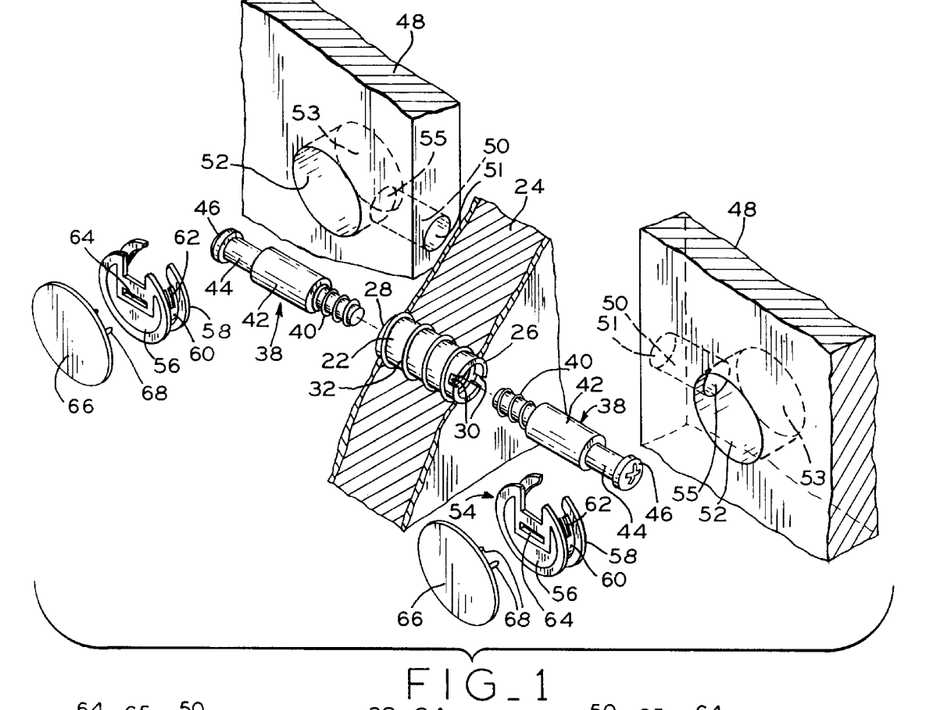
FIG. 1 is an exploded view of the fastener assembly and a portion of a workstation.
Figure 2:
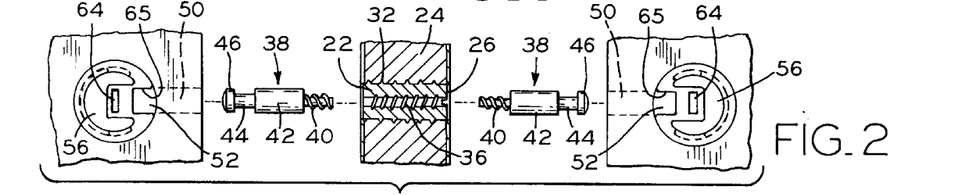
FIG. 2 is an exploded cross-sectional view of FIG. 1.
Figure 3:
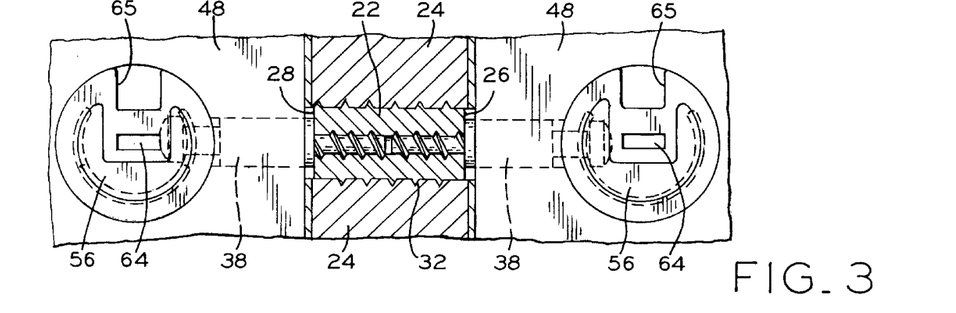
FIG. 3 is a cross-sectional view of FIG. 1 in which the fastener assembly has been assembled.
Figures 4, 5, 6, 7:
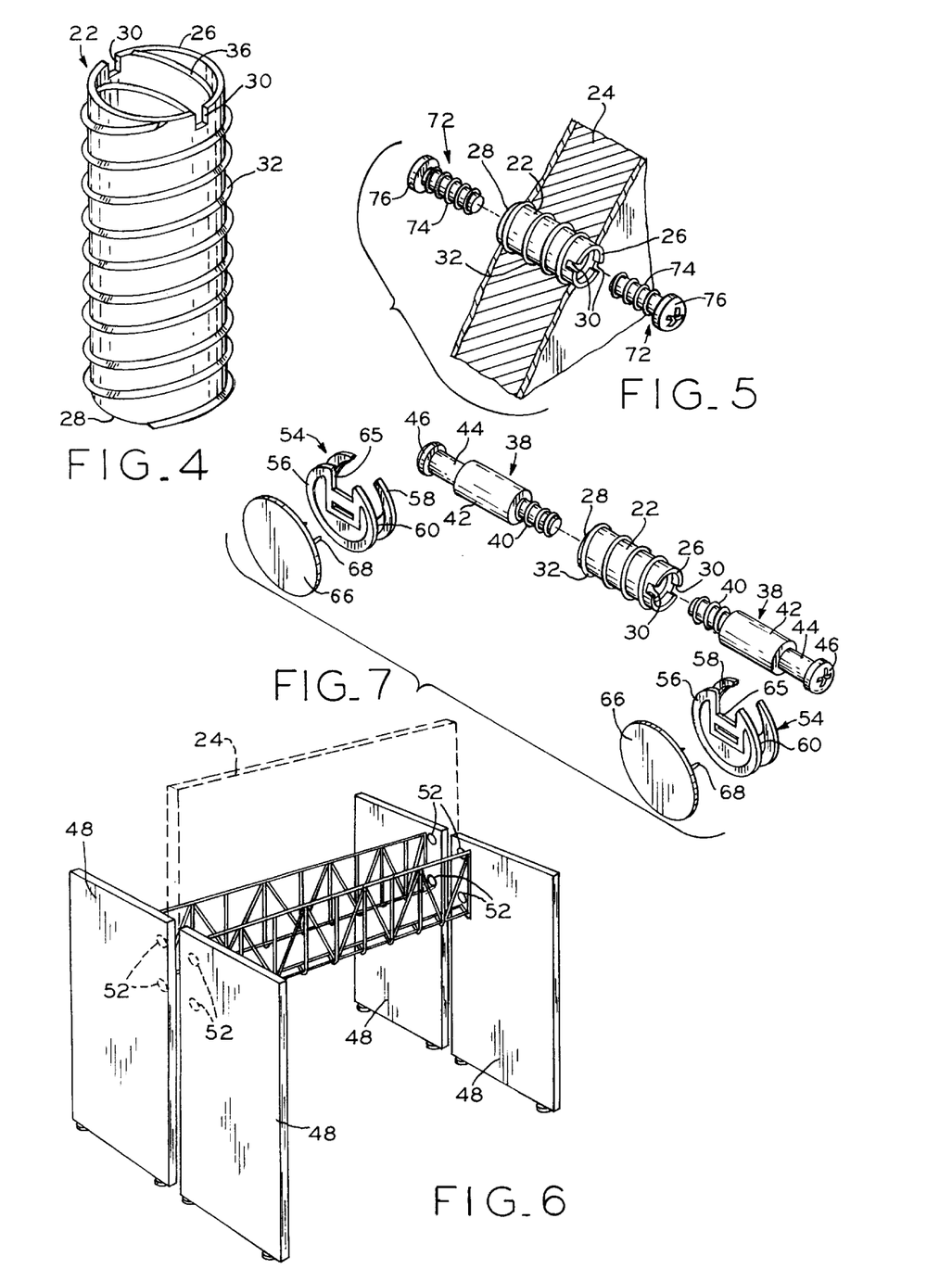
FIG. 4 is a perspective view of the double-threaded insert.
FIG. 5 is an exploded view of a second embodiment of the fastener assembly.
FIG. 6 is a perspective view of a portion of a modular workstation which is interconnected by double-threaded insert assemblies.
FIG. 7 is an exploded view of the fastener assembly used in the workstation of FIG. 6.

One embodiment of the present invention, and its operation, is illustrated in FIGS. 1–3. As shown in FIG. 1, a double threaded insert 22 is disposed in an intermediate panel 24. As best seen in FIG. 4, the double threaded insert 22 has a first slotted end 26 and a second end 28. Slots 30 are adapted to be engaged by a screwdriver, or similar tool when driving the exterior threads 32 into engagement with the panel 24.

Figures 12, 13:
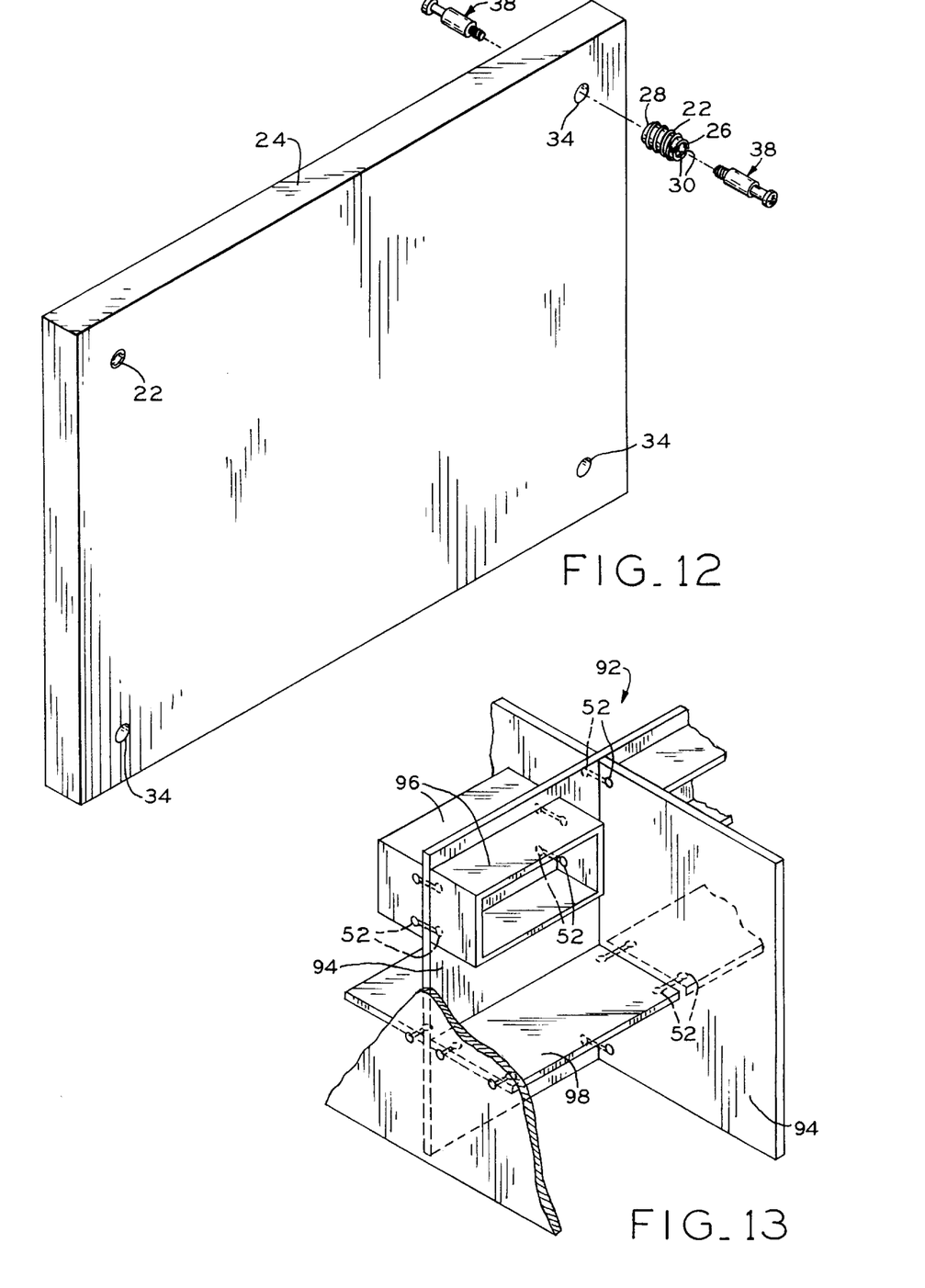
FIG. 12 is a perspective and partially exploded view of a panel for use in a modular furniture system.
FIG. 13 is a partial perspective view of a modular office system.

As seen in FIG. 12, the installation of an insert 22 in a panel 24 can be facilitated by the use of predrilled bore holes 34. Bore holes 34 preferably extend entirely through the panel 24 and allow the insert 22 to be readily installed. The insert 22 is installed in panel 24 in a manner such that the first 26 and second 28 end of the insert 22 are accessible from opposite sides of panel 24. By using an insert 22 having a length slightly less than the thickness of the panel 24, the insert may be installed so that the first 26 and second 28 end are recessed slightly below the exterior surfaces of the panel while still permitting access to the interior threads 36 from both ends 26 and 28. By using an insert 22 having the same length as the thickness of the panel 24 the ends 26 and 28 would, of course, be flush with the exterior surfaces of the panel.

The threaded insert 22 is of a known design previously used to engage threaded fasteners from only one end. The insert 22 may be manufactured of steel and one such insert is the Rampa M6 manufactured by Hans Brugmann, Grabauerftrasse 35, D-2053, Schwarzenbeck, Germany.

Insert 22 has interior threading 36 which is accessible from both the first end 26 and second end 28. A threaded dowel 38 is screwed into both the first 26 and second 28 end of the insert 22. Threaded dowel 38 has a threaded end 40, a generally cylindrical shank 42 and an annular groove 44 located between the shank 42 and a screw head 46. The threaded dowels 38 may be easily secured to opposite ends of the insert 22 by means of a screwdriver or similar tool. The dowels 38, with their shanks 42 and grooved end projecting from opposite sides of the intermediate panel 34, are then inserted into panels 48 or similar bodies which are to be attached to the intermediate panel 24. Each of the panels 48 has a smaller bore hole 50 which is slightly larger than the diameter of the threaded dowel 38. The smaller bore hole 50 has one end 51 at an opening in the exterior surface of the panel 48 and a second end 55 which intersects a larger bore hole 52. The length of the smaller bore hole 50 is dimensioned so that when the threaded dowel is inserted into the bore hole 50 and panel 48 is brought into engagement with intermediate panel 24, the annular groove 44 is projected just inside the larger bore hole 52 where it may be engaged by camming device 54. The larger bore hole 52 has an opening in one exterior surface of panel 48 and terminates in back wall 53.

Figure 11:
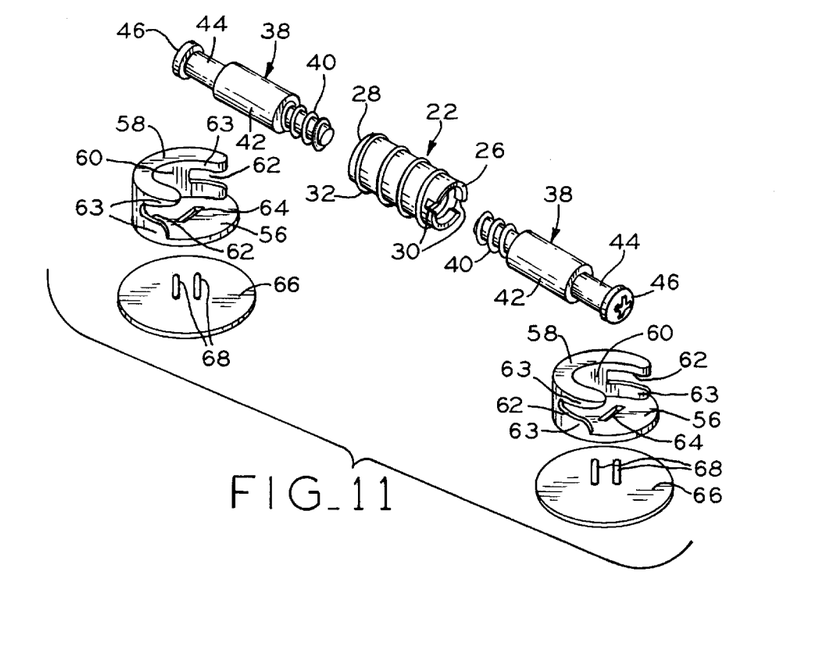
FIG. 11 is an exploded view of a double threaded insert assembly used to interconnect portions of the storage unit of FIG. 10.

Camming device 54 is inserted into bore hole 52 and has a diameter slightly smaller than the bore hole 52. The camming device has a front surface 56 and a back C-shaped surface 58 which are interconnected by a web 60. The web 60 has two open ended slots 62 located on its terminal ends as best shown in FIG. 11. When the threaded dowels 38 are first inserted into bore holes 50 the camming device is positioned as shown in FIG. 2. The grooved end of the dowels 38 is then projected within the larger bore hole 52 and a screwdriver or similar tool is inserted into slot 64 on the front surface 56. The screwdriver is then turned and screw head 46 is thereby engaged by the flanges 63 which define open ended slot 62 as the camming device 54 is moved into the position shown in FIG. 3. The front surface of the camming device may have a mouth 65 which should be directed towards bore hole 50 when the camming device 54 is initially inserted into bore hole 52. The mouth 65 thereby facilitates the orientation of the camming device 54, mouth 65 is not, however, essential to the operation of camming device 54. FIG. 3 shows the fastener system in its final assembled and secured position. Steel, or another suitable material, is used to manufacture threaded dowels 38 and camming device 54 which are well known in the art and may be obtained from numerous suppliers.

After the assembly is secured, as shown in FIG. 3, covers 66 are positioned over the camming device 54 to shield it from view by inserting prongs 68 into slot 64.

One application of the fastener system employing the insert 22 and dowels 38 is shown in FIGS. 6 and 7. Shown in ghost outline in FIG. 6 is an intermediate panel 24 in which four inserts 22 are installed. The inserts are located, two apiece, at opposite lower ends of panel 24 to correspond with the bore holes located in connected panels 48. FIG. 7 shows, in an exploded view, the fastener assembly used to secure the furniture unit of FIG. 6.

In addition to panels 24 and 48, the furniture unit of FIG. 6 includes two welded wire baskets 70 which carry wires and cabling necessary to power and interconnect various pieces of office equipment such as telephones, computers and printers. The wire baskets 70 also function as trusses, helping to maintain the connected panels 48 at a proper relative distance and orientation. The wire baskets 70 could also be used to help support a worksurface panel extending between panels 48. The wire baskets 70 may be attached directly to the panels 48, or, as shown in FIG. 9, the wire baskets 70 may be welded to L-shaped brackets 80 which are attached to panels 48.

Not shown in FIG. 6 are the two worksurface panels which extend horizontally between the two pairs of panels 48 on opposite sides of panel 24. Panels 24 and 48 are manufactured using wood products such as plywood or particle board and may be covered with a wood veneer, high pressure plastic laminate or other suitable covering. Other materials could also be used to manufacture panels 24 and 48 provided the materials had the necessary strength and workability required to install insert 22 and form bore holes 50 and 52. The panels in which the inserts are installed preferably have an actual thickness of 30 mm and a width and height which is dictated by the design of the furniture unit in which the panel will be incorporated.

Figure 8:
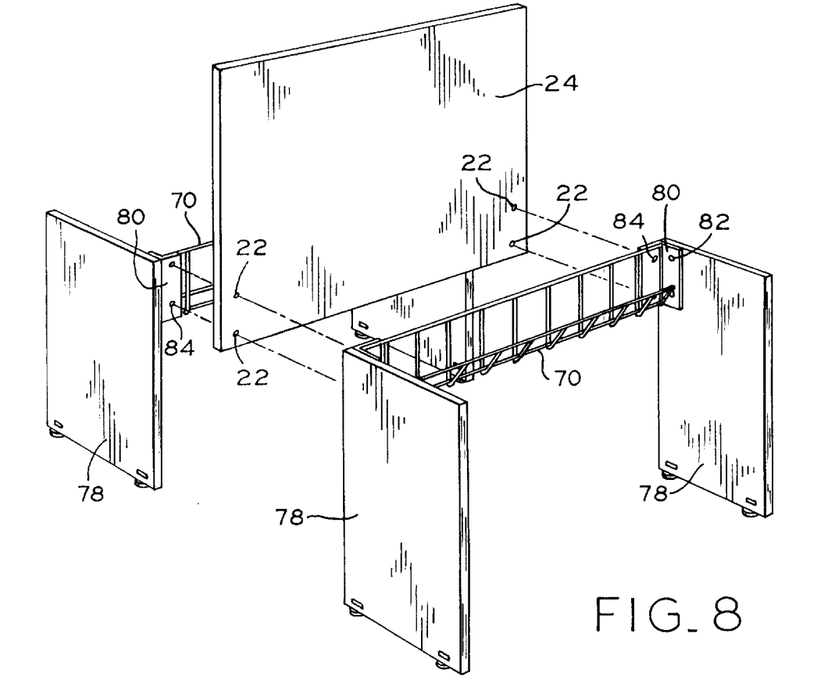
FIG. 8 is an exploded view of a portion of a modular workstation which is interconnected with double threaded insert assemblies.
Figure 9:
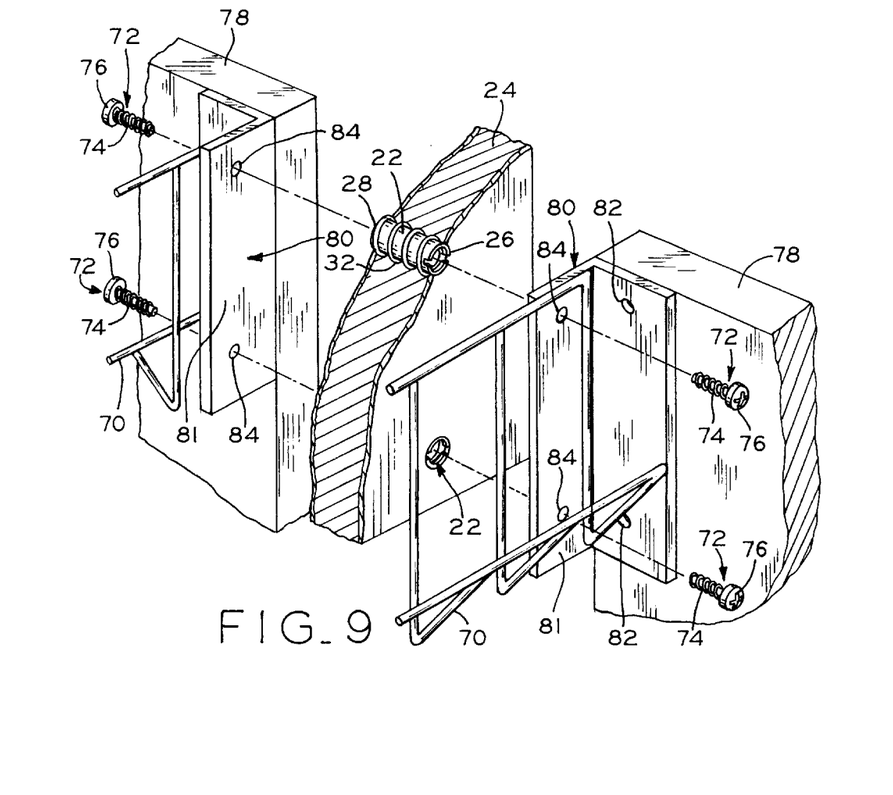
FIG. 9 is a detailed view of the fastener assembly of the modular workstation of FIG. 8.

A second fastener assembly utilizing the double threaded insert 22 is shown in FIGS. 5, 8 and 9. Instead of using threaded dowels 38, common bolts 72 are used to fasten items to the intermediate panel 24. The bolts 72 comprise a threaded end 74 which is insertable into either end of the insert 22 and a bolt head 76. The insert 22 and bolt 72 assembly shown in FIG. 5 can be used to fasten any number of articles to panel 24. FIGS. 8 and 9 illustrate the use of the assembly of FIG. 5 in a double-loaded work station similar to that shown in FIG. 6. In the embodiment shown in FIGS. 8 and 9, the side panels 78 of the work station does not include bore holes 50 and 52. Instead, an L-shaped bracket 80 is attached to the side panels 78 in any well known manner. For example screws, not shown, could be inserted through apertures 82 to secure bracket 80 to side panel 78. An extending flange 81 of bracket 80 includes apertures 84 through which bolts 72 are inserted to engage inserts 22 and thereby secure the bracket 80 to panel 24. Wire basket 70 is welded to bracket 80 and, together with panel 24 and worksurfaces which are not shown, interconnects each pair of side panels 78.

Figure 10:
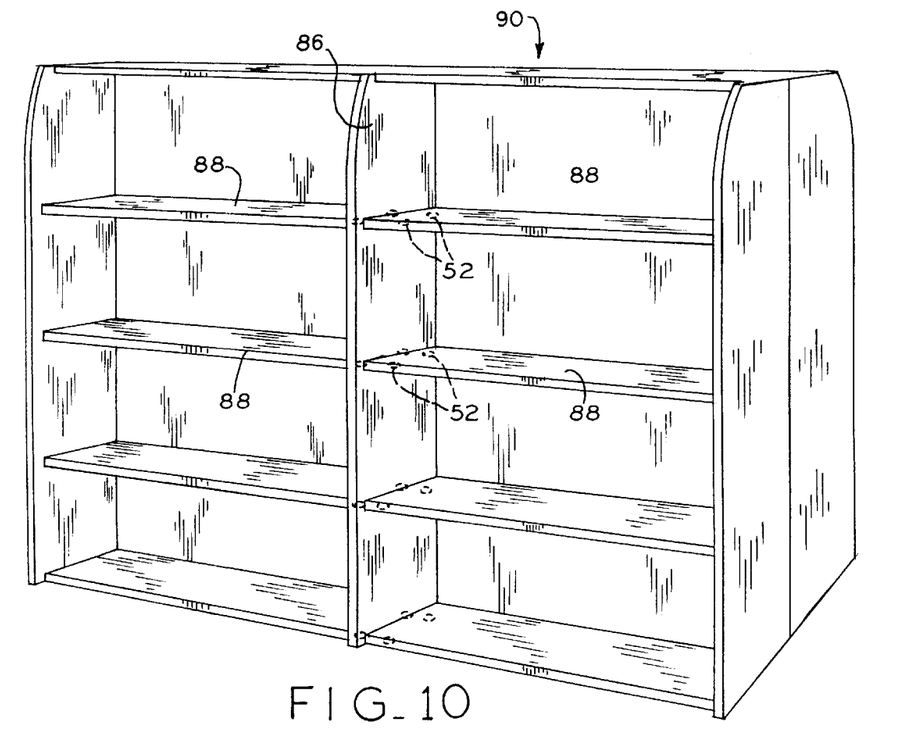
FIG. 10 is a perspective view of a storage unit.

A storage unit 90 is shown in FIG. 10 and the panels which comprise storage unit 90 may be fastened together by using the fastener assembly shown in FIG. 11 in combination with conventional fastener assemblies. This permits the storage unit 90 to be shipped as unassembled flat panels and easily assembled in the location where it will be used. It also permits the storage unit 90 to be easily disassembled and reassembled in a new location at a later date. Some of the panels, such as vertical divider 86, would have a number of inserts 22 installed prior to shipment while other panels, such as shelves 88, would be manufactured with bore holes 50 and 52 and, depending upon the configuration of the unit to be assembled, some panels might include both inserts 22 and bore holes 50 and 52 at different locations near the panel perimeter.

The bore holes 52 are preferably positioned so that covers 66 are not readily visible in the completed furniture unit. The ends of insert 22 will generally be concealed by the object which is attached thereto.

A panel 24, such as that shown in FIG. 12, can be used in a wide variety of different modular furniture units. The panel of FIG. 12 is manufactured according to conventional methods and has bore holes 34 drilled therethrough. The bore holes 34 are drilled in predetermined locations which are governed by the configuration of the furniture unit for which panel 24 is intended.

In addition to their use in individual furniture units, inserts 22 may be utilized in a furniture system 92 having a number of interconnected furniture components and panels. A partial view of a furniture system 92 which includes partition walls 94, overhead cabinets 96 and worksurfaces 98, all of which can be interconnected by using fastener assemblies which include inserts 22 is shown in FIG. 12. Bore holes 52, which are used together with inserts 22, can be seen in FIG. 12 and form connections between various components of furniture system 92.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A furniture assembly comprising:
    an intermediate furniture panel having opposite outer surfaces, said opposite outer surfaces respectively having first and second apertures, said intermediate panel defining a passageway between said first and second apertures;
    first and second furniture components respectively disposed adjacent said first and second apertures;
    first and second threaded fasteners respectively engaging said first and second furniture components; and
    a generally hollow insert having a first and second end, an exterior threaded surface at a threading, engagable interior surface; said insert being disposed in said passageway whereby said exterior surface threadingly engages said intermediate panel and, at said first insert end, said first threaded fastener extends through said first aperture and threadingly engages said interior surface, and, at said second insert end, said second threaded fastener extends through said second aperture and threadingly engages said interior surface, whereby said first and second furniture components are secured to said intermediate panel.

2. The furniture assembly of claim 1 wherein said insert is a generally tubular threaded shell.

3. The furniture assembly of claim 1 wherein said first end of said insert includes a pair of diametrically opposite slots adapted for engagement with a tool.

4. The furniture assembly of claim 1 wherein said insert extends for a shorter length than said passageway.

5. A furniture assembly comprising:
    first and second threaded fasteners;
    an intermediate body having opposite outer surfaces, said opposite outer surfaces respectively having first and second apertures, said body defining a passageway between said first and second apertures;
    a generally hollow insert having first and second ends, an exterior threaded surface and a threadingly engagable interior surface; said insert being disposed in said passageway whereby said exterior surface threadingly engages said intermediate body and, at said first insert end, said first threaded fastener extends through said first aperture and threadingly engages said interior surface, and, at said second insert end, said second threaded fastener extends through said second aperture and threadingly engages said interior surface; and
    first and second furniture components respectively attached to said intermediate body with said first and second fasteners.

6. The furniture assembly of claim 5 wherein said insert is a generally tubular threaded shell.

7. The furniture assembly of claim 5 wherein said first end of said insert includes a pair of diametrically opposite slots adapted for engagement with a tool.

8. The furniture assembly of claim 5 wherein said first and second fasteners are bolts.

9. The furniture assembly of claim 8 wherein said intermediate body is a generally planar panel.

10. The furniture assembly of claim 5 wherein said intermediate body is a generally planar panel and said assembly further comprises first and second furniture components respectively attached to said panel with said first and second fasteners.

11. The furniture assembly of claim 5 wherein said insert extends for a shorter length than said passageway.

12. A fastener assembly comprising:
   first and second threaded fasteners;
   an intermediate body having an outer surface, said outer surface defining first and second apertures, said body defining a passageway between said first and second apertures;
   a generally hollow insert having first and second ends, an exterior threaded surface and a threadingly engageable interior surface; said insert being disposed in said passageway whereby said exterior surface threadingly engages said intermediate body and, at said first end, said interior surface is engagingly accessible to said first threaded fastener through said first aperture and, at said second insert end, said interior surface is engagingly accessible to said second threaded fastener through said second aperture;
   first and second camming devices; and
   wherein said first and second threaded fasteners comprise first and second dowels, each said dowel having a generally cylindrical shank with a threaded first end and an opposite second end having an annular groove; said threaded first ends being adapted for engagement with said insert; said second ends being adapted for respective engagement with said first and second camming devices.

13. The fastener assembly of claim 12 wherein said intermediate body is a first generally planar panel and said fastener assembly further comprises second and third generally planar panels, said first and second camming devices disposed in second and third generally planar panels respectively;
   whereby engagement of said dowel first ends to said insert and engagement of said dowel second ends to said first and second camming devices secures said second and third panels to said first panel.

14. A modular furniture unit comprising:
   a generally planar panel having first and second outer surfaces on opposing sides of said panel, said panel defining a passageway extending from a first aperture in said first outer surface to a second aperture in said second outer surface;
   first and second threaded fasteners;
   a generally hollow tubular insert having first and second ends, an exterior threaded surface and a threadingly engagable interior surface, said insert being disposed in said passageway whereby said exterior surface threadingly engages said panel and, at said first insert end, said interior surface is engagingly accessible to said first threaded fastener through said first aperture and, at said second insert end, said interior surface is engagingly accessible to said second threaded fastener through said second aperture; and
   first and second furniture components attached to said panel by means of said first and second threaded fasteners respectively.

15. The modular furniture unit of claim 14 wherein said generally planar panel is vertically oriented and said first and second furniture components are generally planar horizontally oriented worksurface members.

16. The modular furniture unit of claim 15 wherein said generally planar panel defines a second passageway extending from a third aperture in said first outer surface to a fourth aperture in said second outer surface and said furniture unit further comprises:
   third and fourth threaded fasteners;
   a second generally hollow tubular insert having first and second ends, an exterior threaded surface and a threadingly engagable interior surface, said second insert being disposed in said second passageway whereby said exterior surface of said second insert threadingly engages said panel and, at said first end of said second insert, said interior surface of said second insert is engagingly accessible to said third threaded fastener through said third aperture and, at said second end of said second insert, said interior surface is engagingly accessible to said fourth threaded fastener through said fourth aperture; and said third and fourth threaded fasteners respectively further secure said first and second furniture components to said panel.

17. The modular furniture unit of claim 14 wherein said generally planar panel is vertically oriented and said first and second furniture components are overhead storage units.

18. The modular furniture unit of claim 17 wherein said generally planar panel defines a second passageway extending from a third aperture in said first outer surface to a fourth aperture in said second outer surface and said furniture unit further comprises:
   third and fourth threaded fasteners;
   a second generally hollow tubular insert having first and second ends, an exterior threaded surface and a threadingly engagable interior surface, said second insert being disposed in said second passageway whereby said exterior surface of said second insert threadingly engages said panel and, at said first end of said second insert, said interior surface of said second insert is engagingly accessible to said third threaded fastener through said third aperture and, at said second end of said second insert, said interior surface is engagingly accessible to said fourth threaded fastener through said fourth aperture; and said third and fourth threaded fasteners respectively further secure said first and second furniture components to said panel.

19. A modular furniture unit comprising:
   a generally planar panel having first and second outer surfaces on opposing sides of said panel, said panel defining a passageway extending from a first aperture in said first outer surface to a second aperture in said second outer surface;
   first and second threaded fasteners;
   a generally hollow tubular insert having first and second ends, an exterior threaded surface and a threadingly engageable interior surface, said insert being disposed in said passageway whereby said exterior surface threadingly engages said panel and, at said first insert end, said interior surface is engagingly accessible to said first threaded fastener through said first aperture and, at said second insert end, said interior surface is engagingly accessible to said second threaded fastener through said second aperture;

first and second furniture components attached to said panel by means of said first and second threaded fasteners respectively; and wherein said first and second threaded fasteners are first and second dowels each having a generally cylindrical shank with a threaded first end and an opposite second end having an annular groove; said threaded first ends being adapted for engagement with said tubular insert; said second ends being adapted for respective engagement with first and second camming devices disposed in said first and second furniture components.

20. The modular furniture unit of claim 19 wherein said first and second furniture components are first and second generally planar panel components.

21. The modular furniture unit of claim 19 wherein said generally planar panel is vertically oriented and said first and second furniture components are first and second generally planar horizontal support members.

22. A modular furniture unit comprising:

a generally planar panel having first and second outer surfaces on opposing sides of said panel, said panel defining a passageway extending from a first aperture in said first outer surface to a second aperture in said second outer surface;

first and second threaded fasteners;

a generally hollow tubular insert having first and second ends, an exterior threaded surface and a threadingly engageable interior surface, said insert being disposed in said passageway whereby said exterior surface threadingly engages said panel and, at said first insert end, said interior surface is engagingly accessible to said first threaded fastener through said first aperture and, at said second insert end, said interior surface is engagingly accessible to said second threaded fastener through said second aperture;

first and second furniture components attached to said panel by means of said first and second threaded fasteners respectively; and wherein said generally planar panel is vertically oriented and defines a second passageway extending from a third aperture in said first outer surface to a fourth aperture in said second outer surface and said furniture unit further comprises:

third and fourth threaded fasteners;

a second generally hollow tubular insert having first and second ends, an exterior threaded surface and a threadingly engagable interior surface, said second insert being disposed in said second passageway whereby said exterior surface of said second insert threadingly engages said panel and, at said first end of said second insert, said interior surface of said second insert is engagingly accessible to said third threaded fastener through said third aperture and, at said second end of said second insert, said interior surface is engagingly accessible to said fourth threaded fastener through said fourth aperture; and third and fourth furniture components attached to said panel by means of said third and fourth threaded fasteners respectively.

23. The modular furniture unit of claim 22 wherein said generally planar panel is vertically oriented and said first and third furniture components are first and third generally planar vertically oriented panel components, and said furniture unit further comprises a wire truss member interconnecting said first and third panel components.

24. The modular furniture unit of claim 23 wherein said first and third vertically oriented panel components are disposed at approximately 90° to said generally planar panel; said second and fourth furniture components are second and fourth generally planar vertically oriented panel components disposed at approximately 90° to said generally planar panel; and said furniture unit further comprises a second wire truss member interconnecting said second and fourth panel components.

25. The modular furniture unit of claim 24 wherein said first, second, third and fourth threaded fasteners are first, second, third and fourth dowels each having a generally cylindrical shank with a threaded first end and an opposite second end having an annular groove; said threaded first ends being adapted for engagement with one of said inserts and said second ends being respectively adapted for engagement with first, second, third and fourth camming devices disposed in said first, second, third and fourth panel components respectively.

26. The modular furniture unit of claim 24 wherein said first, second, third and fourth threaded fasteners are first, second, third and fourth bolts; and said furniture unit further comprises first, second, third and fourth brackets attached to said first, second, third and fourth panel components respectively and said first, second, third and fourth brackets are secured to said generally planar panel with said first, second, third and fourth bolts respectively.

27. A furniture assembly comprising:

an intermediate structural member having opposite outer surfaces, said opposite outer surfaces respectively having first and second apertures, said intermediate member defining a passageway between said first and second apertures;

a generally hollow insert having first and second ends and an interior surface, said insert securely disposed in said passageway;

first and second fasteners, said first and second fasteners respectively having first and second exterior fastener surfaces, said first fastener extending through said first aperture and said first insert end, said first exterior fastener surface engaging said interior surface whereby said first fastener is secured to said insert, said second fastener extending through said second aperture and said second insert end, said second exterior fastener surface engaging said interior surface whereby said second fastener is secured to said insert; and first and second furniture components respectively attached to said intermediate panel by means of said first and second fasteners.

28. The furniture assembly of claim 27 wherein said interior surface is a threaded surface and said first and second exterior fastener surfaces are threaded surfaces.

29. The furniture assembly of claim 27 wherein said insert has a threaded exterior surface.

30. The furniture assembly of claim 27 wherein said insert extends for a shorter length than said passageway.

* * * * *